March 17, 1942.    O. ACKERMANN    2,276,639
VACUUM CONTROL SYSTEM
Filed May 3, 1940
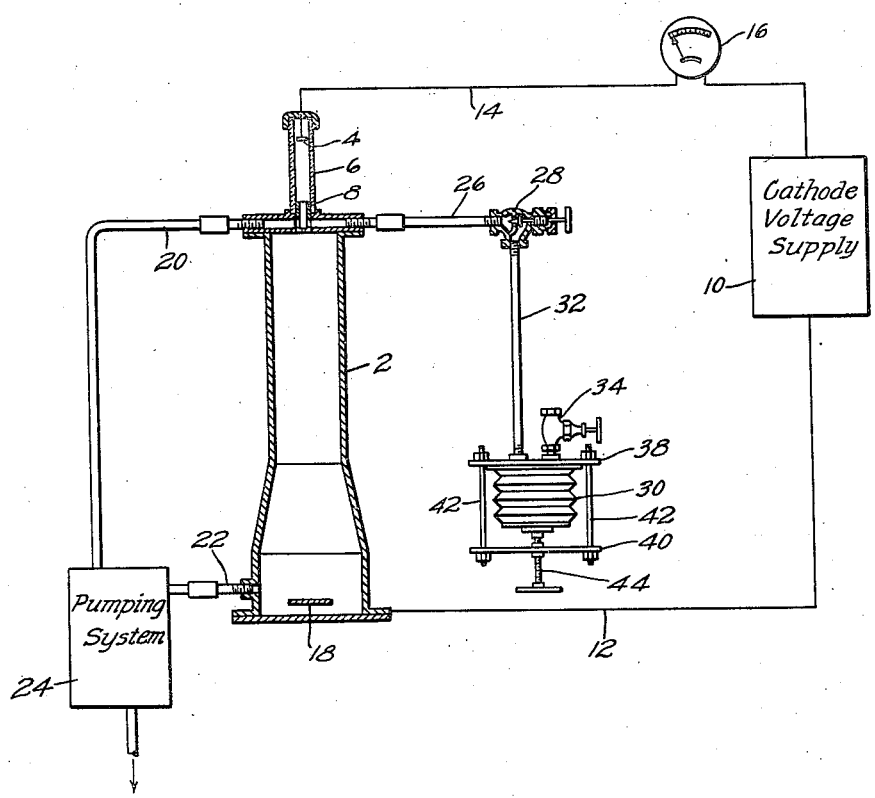
WITNESSES:
INVENTOR
Otto Ackermann.
ATTORNEY Patented Mar. 17, 1942

2,276,639

UNITED STATES PATENT OFFICE 2,276,639

VACUUM CONTROL SYSTEM

Otto Ackermann, Irwin, Pa., assignor to Westinghouse Electric & Manufacturing Company, East Pittsburgh, Pa., a corporation of Pennsylvania Application May 3, 1940, Serial No. 333,121

2 Claims. (Cl. 250—27.5)

The present invention relates to vacuum vessels, and it has particular relation to a method and means for maintaining constant the pressure within such vessels containing electronic apparatus.

With some vacuum vessels such as those for cathode-ray oscillographs which must be opened to permit an insertion of a photographic film therein, it is necessary to employ a continuously operating pumping system to maintain a constant vacuum or pressure. In order to keep the vacuum constant, it is usual to provide such vessels with a leak valve arrangement through which gas at a higher pressure may enter. The leak valve employed must be very small and its accuracy is subject to impairment by dirt or other foreign matter. For this reason, it is extremely difficult to provide the very slight adjustments in passage area which are necessary to maintain the vacuum constant.

According to the present invention, minute adjustments of the amount of gas entering the vacuum vessel are made by controlling the pressure of this gas rather than by mechanical valve adjustments which are open to the above objections. In one embodiment of the invention, this is done by entrapping air in a metallic bellows and adjusting the volume of the bellows by small amounts. It has been found that pressure changes of a few centimeters of mercury in the gas within the bellows will cause changes in the flow of air through the leak valve over the range desirable for controlling the vacuum in a cathode-ray oscillograph.

It is accordingly an object of the invention to provide an improved arrangement for controlling the pressure within a vacuum vessel.

It is another object of the invention to provide a system for maintaining constant the amount of vacuum within a vessel for electronic apparatus.

A further object of the invention is to provide a system wherein the vacuum within a pumped vessel for electronic apparatus is maintained constant by controlling the pressure of a gas communicating therewith through a leak valve.

Other objects and advantages of the invention will appear from the following detailed description taken in conjunction with the accompanying drawing in which the single figure is a combined schematic diagram and sectional view of an embodiment thereof.

In the drawing, there is shown a metallic vacuum vessel 2 for a cathode-ray oscillograph, which is preferably of the cold-cathode type. A cathode 4 is disclosed within a glass tube 6 secured to the vessel 2 and electrically insulated therefrom. A metallic anode 8 is within the vessel 2 and electrically connected thereto, and the vessel in turn is electrically connected to the positive terminal of a cathode voltage supply 10 through conductor 12. The cathode 4 is connected by means of a conductor 14 to the supply 10, and a milliammeter 16 is inserted in series therewith. Within the vessel 2 is disposed a photographic film or plate 18 which may be of any known type commonly employed in such apparatus.

Pipes or tubes 20 and 22 communicate with the interior of the vessel 2 and with a pumping system 24 to continuously pump gas from the vessel during the operation of the oscillograph. Another pipe or tube 26 connects the interior of the vessel with a leak valve 28 which in turn communicates with a metallic bellows 30 through another tube 32. A valve 34 is attached to the bellows 30 to provide communication between it and the atmosphere when desired. The valve 28 is preferably a needle valve which permits very small adjustments in the size of its opening.

One end of the bellows 30 is attached to a stationary plate 38 which in turn supports another plate 40 by means of bolts 42. Secured to and threaded through the plate 40 is a set screw 44 which contacts the free end of the bellows 30. The set screw 44 is preferably provided with very fine threads to permit minute adjustments in the volume of the bellows.

With the above description in mind, the operation of the invention will be readily understood. Upon the film 18 being inserted within the vessel the pumping system 24 is placed in operation as previously described. By means of the valve 34, atmosphere is permitted to enter the bellows 30 after which the valve is closed. By means of the leak valve 28, an adjustment is obtained permitting approximately the desired amount of air to enter the vessel. Thereafter, the amount of air passing through the tube 26 is controlled by means of the set screw 44 changing the volume of the bellows 30, and thereby the pressure of the air therein.

Since the cathode current is a function of the pressure within the vessel, the milliammeter 16 may be employed to indicate pressure variations in the oscillograph.

From the above, it will be seen that the invention provides a simple and accurate means for maintaining a constant vacuum in a pumped-vacuum vessel. Since the control of the degree of vacuum or the actual pressure vacuum in the vessel is exercised principally by changing the pressure of the gas within the bellows 30, instead of by mechanical adjustments of the leak valve 28, the danger of abrupt changes in vacuum due to inaccuracies in valve construction or foreign matter on portions thereof is eliminated. It has been found that with a usual type of oscillograph slight adjustments of the set screw 44 at approximately 10 minute intervals is sufficient to maintain the vacuum substantially constant. Whenever it is necessary, the air within the bellows 30 may be renewed by opening the valve 34 for a short time.

The invention will be found applicable to various other equipment such as X-ray tubes and mass spectrometers in addition to cathode-ray oscillographs. Since various modifications of the embodiment shown and described may be made without departing from its spirit and scope, it is intended that the invention shall be limited only by the appended claims.

I claim as my invention:

1. A gas-filled vessel for electronic apparatus, and a device for controlling the pressure therein comprising a flexible bellows receptacle containing a gas at a pressure greater than that within said vessel, a conduit member connecting said vessel and said bellows receptacle together, an adjustable valve disposed in said conduit member for controlling the gas flow therethrough, and adjustable means engaging said receptacle operable independently of said valve for adjusting the volume of said bellows receptacle to vary the pressure of the gas therein and thereby control the flow of gas through said adjustable valve.

2. A gas-filled vessel for receiving a pressure responsive device, a flexible bellows receptacle containing a gas at a pressure exceeding that within said vessel, means providing a restricted leakage flow of gas from said receptacle into said vessel, said last named means including a conduit member connecting said vessel and said bellows receptacle together, and an adjustable member engaging said bellows receptacle and operable for adjusting the volume of the receptacle to vary the pressure of the gas therein and thereby control the rate of leakage of gas through said leakage means.

OTTO ACKERMANN.